United States Patent
Hession

(10) Patent No.: US 10,647,155 B2
(45) Date of Patent: May 12, 2020

(54) DEVICE FOR UNIMPEDED MOVEMENT OF SURGICAL TABLE

(71) Applicant: Peter Hession, Greenwood Village, CO (US)

(72) Inventor: Peter Hession, Greenwood Village, CO (US)

(*) Notice: Subject to any disclaimer, the term of this patent is extended or adjusted under 35 U.S.C. 154(b) by 0 days.

(21) Appl. No.: 15/915,277

(22) Filed: Mar. 8, 2018

(65) Prior Publication Data

US 2018/0281516 A1    Oct. 4, 2018

Related U.S. Application Data

(60) Provisional application No. 62/468,755, filed on Mar. 8, 2017.

(51) Int. Cl.
| | |
|---|---|
| *A46B 3/00* | (2006.01) |
| *B60B 33/00* | (2006.01) |
| *A61G 13/00* | (2006.01) |
| *A61G 15/10* | (2006.01) |
| *A61G 13/10* | (2006.01) |

(52) U.S. Cl.
CPC ............... *B60B 33/00* (2013.01); *A46B 3/00* (2013.01); *A61G 13/00* (2013.01); *A61G 13/10* (2013.01); *A61G 15/10* (2013.01); *A61G 2203/70* (2013.01); *B60B 2200/26* (2013.01); *B60B 2900/551* (2013.01)

(58) Field of Classification Search
CPC ...... B60B 33/00; B60B 2200/26; A46B 13/00
See application file for complete search history.

(56) References Cited

U.S. PATENT DOCUMENTS

| | | | | |
|---|---|---|---|---|
| 901,114 | A | | 10/1908 | Loveless et al. |
| 2,046,384 | A | | 7/1936 | Katcher |
| 2,397,707 | A | * | 4/1946 | Travis ..................... A47L 13/26 15/50.1 |
| 2,471,958 | A | * | 5/1949 | Humphreys ............ B60B 33/00 16/18 CG |
| 2,518,765 | A | * | 8/1950 | Ecker ...................... A47L 13/12 15/115 |
| 5,414,889 | A | * | 5/1995 | Sartori .................. A46B 5/0075 15/144.1 |
| 5,615,450 | A | | 4/1997 | Butler |
| 6,151,747 | A | * | 11/2000 | Newman ................ A46B 17/08 15/159.1 |
| 7,836,540 | B2 | * | 11/2010 | Vasilakes ........... A46B 15/0002 15/1.52 |

(Continued)

*Primary Examiner* — Michael D Jennings
(74) *Attorney, Agent, or Firm* — Nick Quinn; Gunn, Lee & Cave, P.C.

(57) ABSTRACT

A device for removing obstructions impeding movement of a piece of equipment is disclosed. The device includes a sweep housing securely holding at least part of a rectangular sweep. A bristle portion of the sweep extends downward and away from the sweep housing, and includes a plurality of bristles. The sweep housing is made up of an inside bracket, which mounts to the surgical table by an adhesive strip or other means, and an outside bracket which comprises a thumbscrew or other locking mechanisms for securing the sweep housing and sweep in a fixed position with respect to each other. When an operator mounts the device, obstructions are pushed away from castors on the base of the surgical table by the one or more bristles.

30 Claims, 7 Drawing Sheets

(56) References Cited

U.S. PATENT DOCUMENTS

| | | | | |
|---|---|---|---|---|
| 8,122,557 | B2* | 2/2012 | Arnold | A46B 7/04 |
| | | | | 15/114 |
| 8,635,733 | B2* | 1/2014 | Bardzilowski | A46B 13/001 |
| | | | | 15/160 |
| 8,819,883 | B2* | 9/2014 | Laing | A63B 57/60 |
| | | | | 15/160 |
| 9,247,804 | B2* | 2/2016 | Butler | A46B 7/042 |
| 9,375,076 | B2* | 6/2016 | Weis | A46B 7/04 |
| 9,944,120 | B1* | 4/2018 | Butler | B60B 33/0063 |
| 2004/0031116 | A1* | 2/2004 | Coleman | A46B 7/02 |
| | | | | 15/172 |
| 2009/0223007 | A1* | 9/2009 | Li | A46B 5/0095 |
| | | | | 15/105 |
| 2015/0246579 | A1* | 9/2015 | Stone | B60B 33/0023 |
| | | | | 16/18 CG |
| 2016/0278510 | A1* | 9/2016 | Hevlin | A47L 13/00 |

* cited by examiner

DEVICE FOR UNIMPEDED MOVEMENT OF SURGICAL TABLE

CROSS REFERENCES TO RELATED APPLICATION

This application claims the benefit of and priority to U.S. Provisional Application Ser. No. 62/468,755 filed Mar. 8, 2017, which is incorporated by reference herein.

FEDERALLY SPONSORED RESEARCH OR DEVELOPMENT

Not applicable.

BACKGROUND OF THE INVENTION

1. Field of the Invention

The present invention relates to the movement of tables and other equipment with caster wheels. More specifically, the invention is a sweeping device that attaches to the moving piece of equipment and prevents objects on the ground from impeding movement of the caster wheels.

2. Description of the Related Art

Surgical tables and other large pieces of equipment can present particular problems—namely, efficient movement and adjustment. These problems are solved, in part, by using caster wheels. Unfortunately, caster wheels only solve part of the problem, and introduce new problems. Once caster wheels are added, the weight of the surgical table or other equipment, may damage cables, cords or other objects located on the ground if and when the caster wheel is run across. Additionally, the cables, cords or other objects are easily tangled in the caster wheel which can abruptly stop the equipment in its path. At a minimum, cables, cords or other objects slow down an operator's ability to move the surgical table or other large piece of equipment. In a surgical environment, these problems can have devastating consequences.

BRIEF SUMMARY OF THE INVENTION

It is an object of the present invention to provide for unimpeded movement of a surgical table when rotating, pushing, or pulling such a table.

These and other embodiments of the present invention will become apparent to those of skill in the art upon review of this specification, including its drawings and claims.

DETAILED DESCRIPTION OF THE INVENTION

Figure 1:
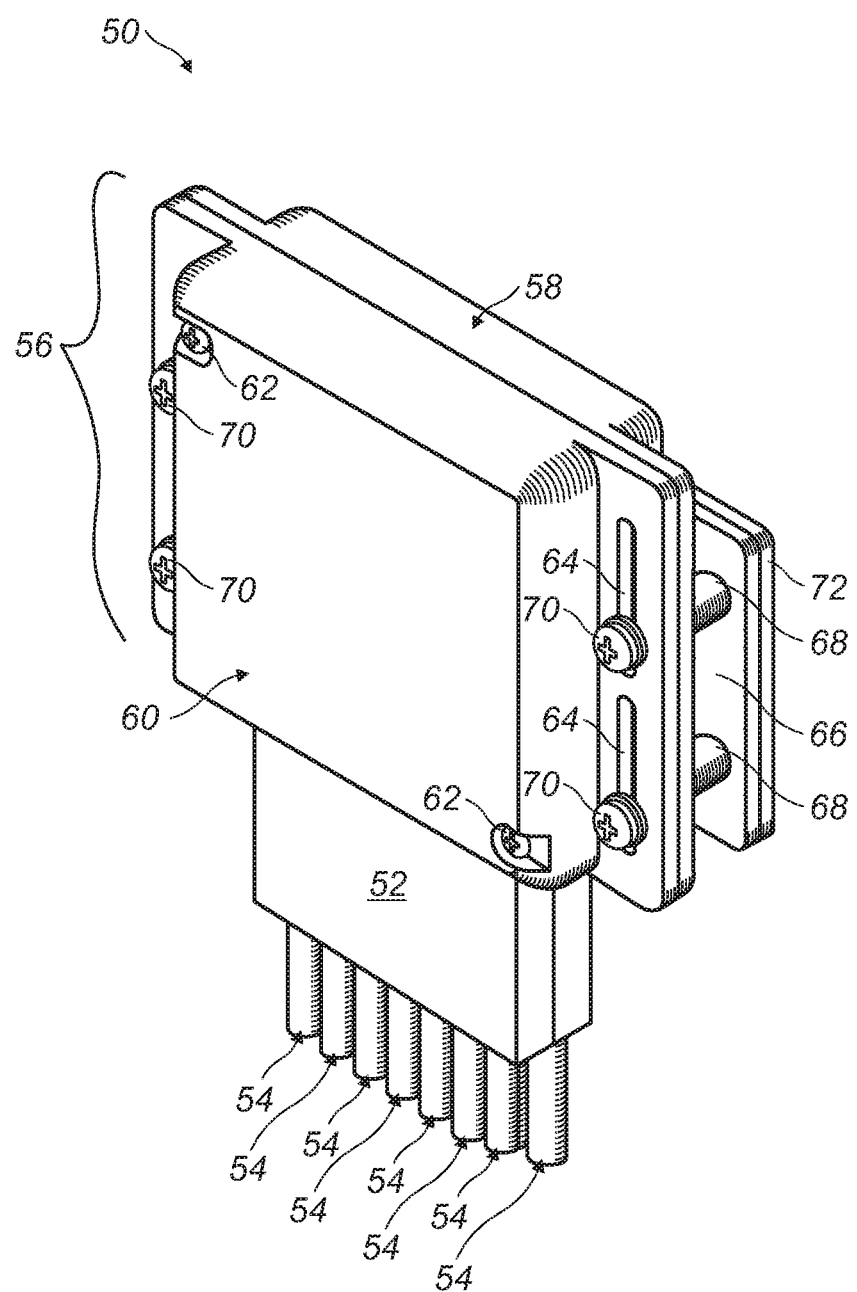
FIG. 1 is a perspective view of one embodiment of the present invention.
Figure 2:
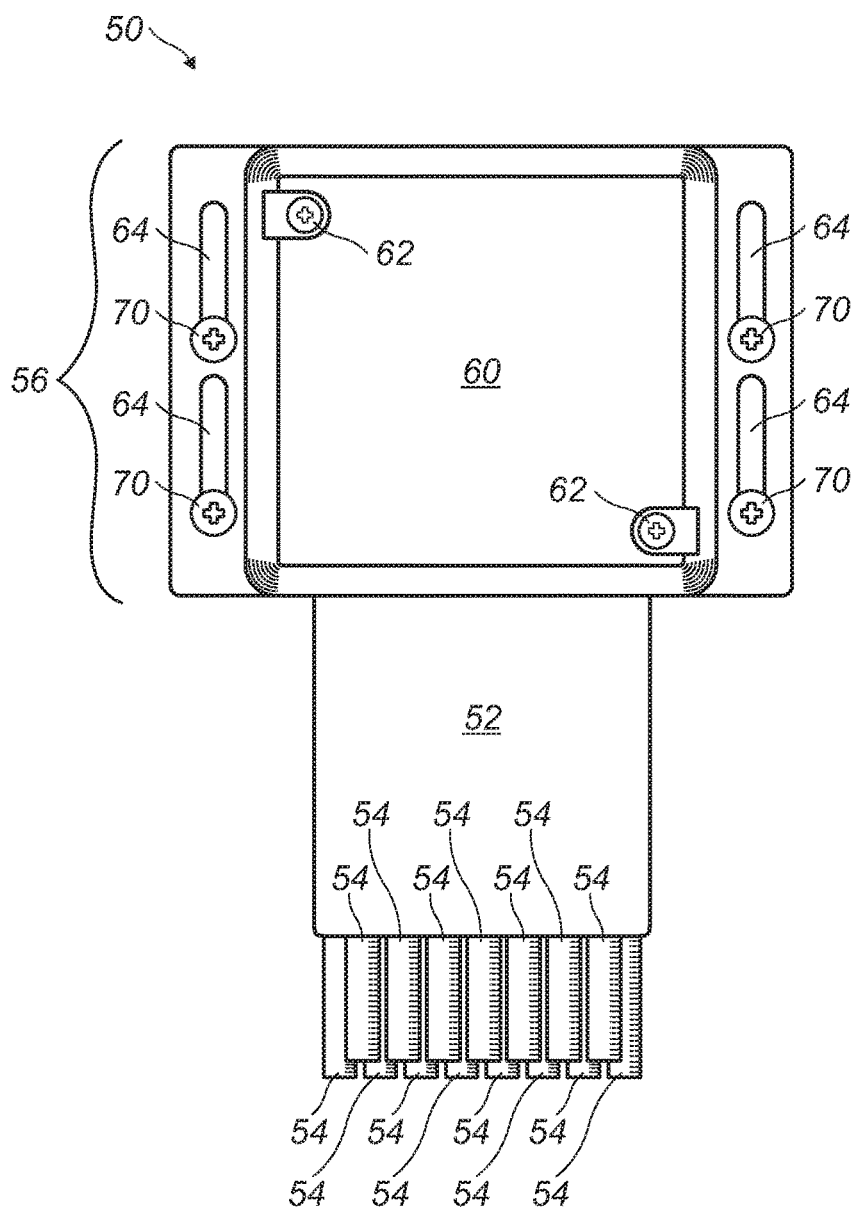
FIG. 2 is a front plan view of the embodiment shown in FIG. 1.
Figure 3:
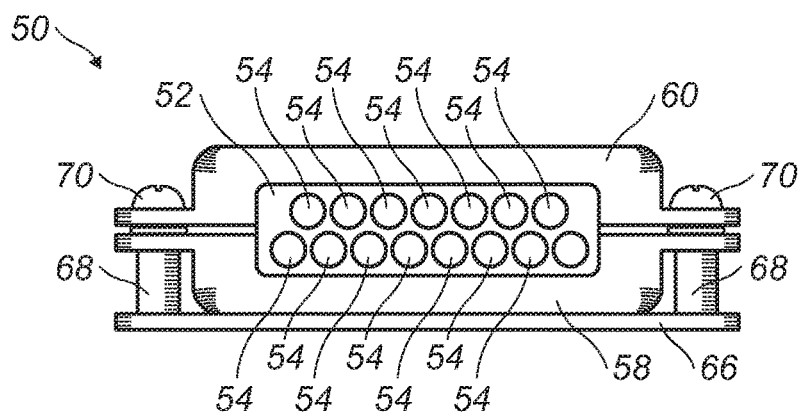
FIG. 3 is a bottom plan view of the embodiment shown in FIG. 1.

FIGS. 1, 2 and 3 depict one embodiment of the present invention. The embodiment may be characterized in part by a sweeping device 50 made up of a sweep 52 with a plurality of bristles 54 and a sweep housing 56.

The sweep housing 56 consists of an inside bracket 58 and an outside bracket 60. The inside bracket 58 and an outside bracket 60 are secured to one another by one or more housing screws 62. Part of the sweep 52 is enclosed by the sweep housing 56.

The inside bracket 58 and the outside bracket 60 further comprise one or more elongated pilot openings 64. In this embodiment, each of the four elongated pilot openings 64 of the inside bracket 58 correspond to one of the four elongated pilot openings 64 of the outside bracket 60.

This sweeping device 50 also consists of a mounting plate 66. The mounting plate 66 is positioned against the inside bracket 58. The mounting plate 66 consists of four mounting plate standoffs 68 that extend outwardly from and on the same side of the mounting plate 66. The inside bracket 58 and the outside bracket 60 and further secured to one another, and accordingly secured to the mounting plate by virtue of mounting screws 70. Using elongated pilot openings 64 allows for adjustment of the mounting plate 66 relative to the sweep housing 56.

On the side of the mounting plate 66 opposite the inside bracket 60 is a double-sided adhesive strip 72. The adhesive strip 72 adheres to the mounting plate 66 on one side and on the opposite side adheres to a surgical table.

FIGS. 2 and 3 illustrate two rows of bristles 54, wherein the seven bristles 54 on the first row are shorter than the eight bristles 54 in the second row by 0.125". As discussed below and illustrated in the drawings, bristles of the present invention may be of alternative thicknesses, lengths, rigidity, stiffness, shapes, arrangement, materials and combination of one or more of the above characteristics.

Figure 4:
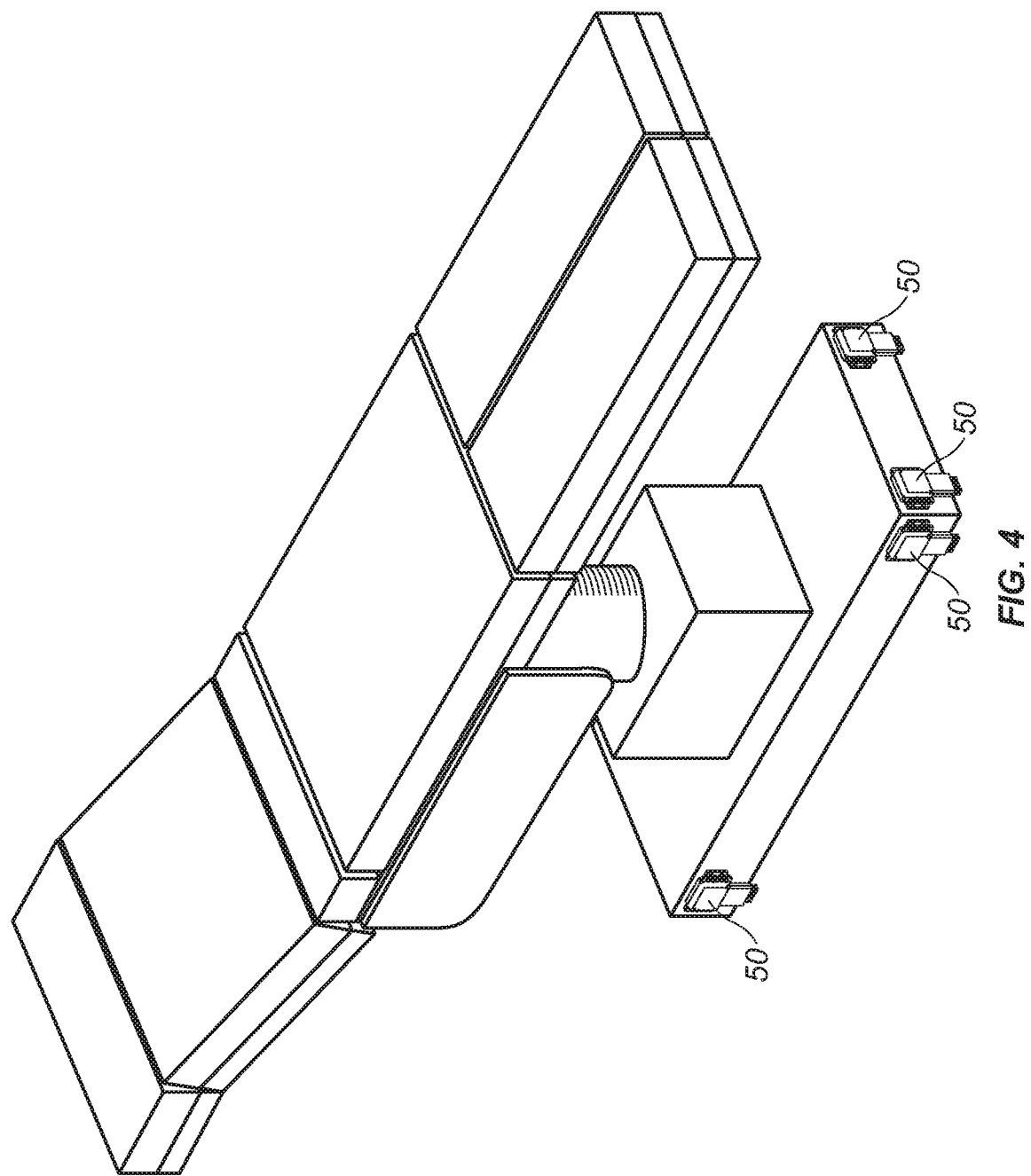
FIG. 4 illustrates several units of the embodiment shown in FIG. 1 attached to a surgical table.

FIG. 4 illustrates one or more sweeping devices 50 attached to a surgical table. When the surgical table is moved (by rotation or translation) in the operating room, the bristles 54 of the sweeping device 50 prevent wires, cables and other impediments in the surgical environment from impeding movement of the surgical table.

Figure 5:
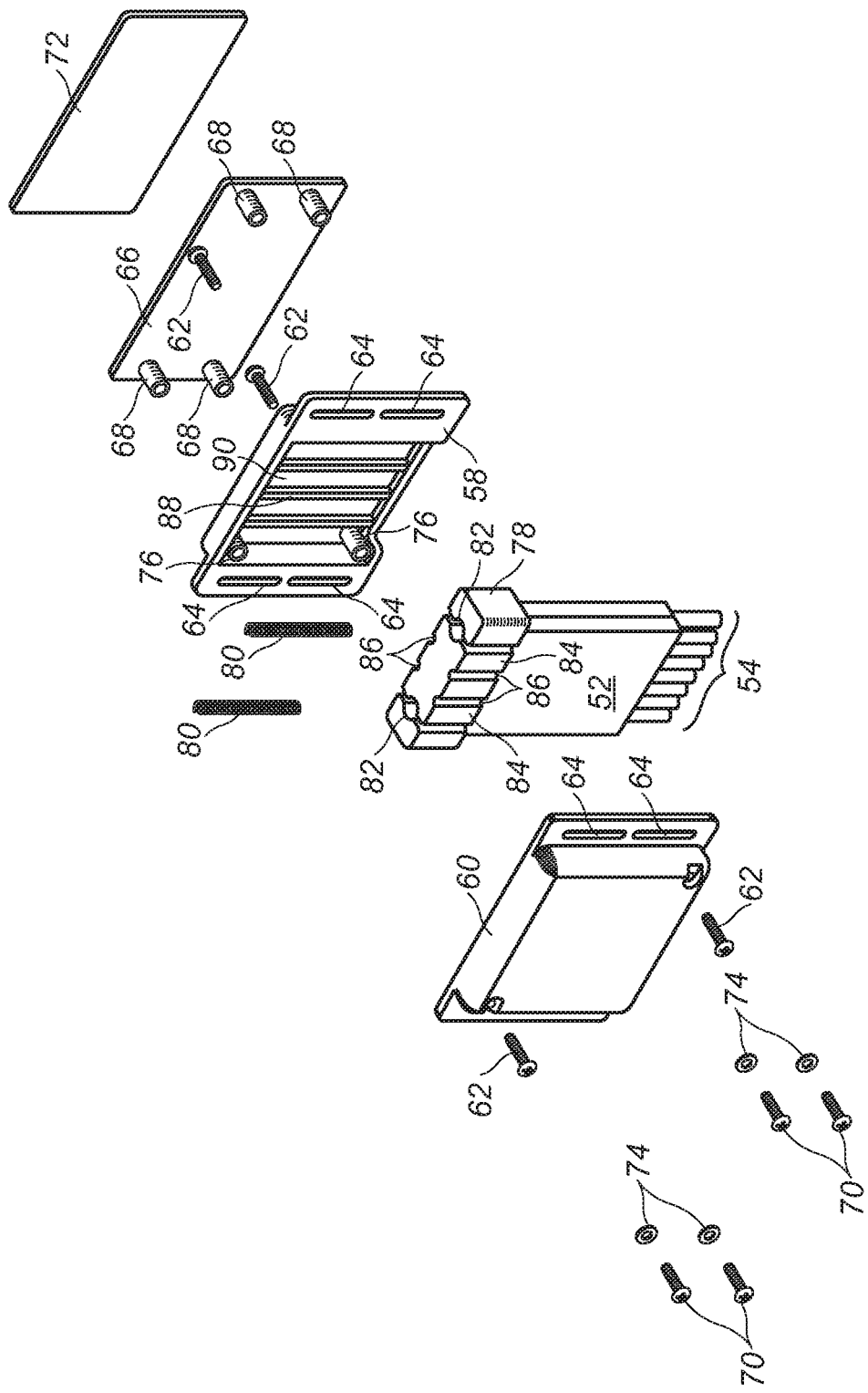
FIG. 5 is an exploded view of the embodiment shown in FIG. 1.

FIG. 5 illustrates an exploded view of the sweeping device 50 illustrated in FIGS. 1-4. This figure illustrates the use of four mounting washers 74, each of which distribute the load from a corresponding mounting screw 70 as the mounting screw is passed through the elongated pilot opening 64 and into the corresponding mounting standoff 68.

Also illustrated by this FIG. 5 are the interior standoffs 76, which are located on the interior portion of the inside bracket 58. Each interior standoff 76 receives the housing screws 62 as they pass through the outside bracket 60.

Also illustrated by this FIG. 5 is the sweep head 78 positioned at the end of the sweep 52 opposite the end of the sweep 52 where the bristles 54 are located. In assembled form, the sweep head 78 is situated within the sweep housing 56. One or more springs 80 are placed within spring orifices 82 in the spring head 78. The top side of the springs 80 abut the top, interior side of the sweep housing 56. The springs 80 bias such that bristles 54 remain in contact with floor or other ground surface when the sweeping device 50 is in use.

The sweep head 78 further comprises multiple sweep head convex tracks 84 and multiple sweep head concave tracks 86. The interior of the sweep housing 56 comprises multiple housing convex tracks 88 and multiple housing concave tracks 90 (although not shown with respect to the outside bracket 60). In this embodiment, a sweep head convex track 84 corresponds with a housing concave track 90 and a sweep head concave track 86 corresponds with a housing convex track 88 (collectively "Track Alignment"). This Track Alignment leads to efficient, linear movement of the sweep head 78 within the sweep housing 56.

Figure 6:
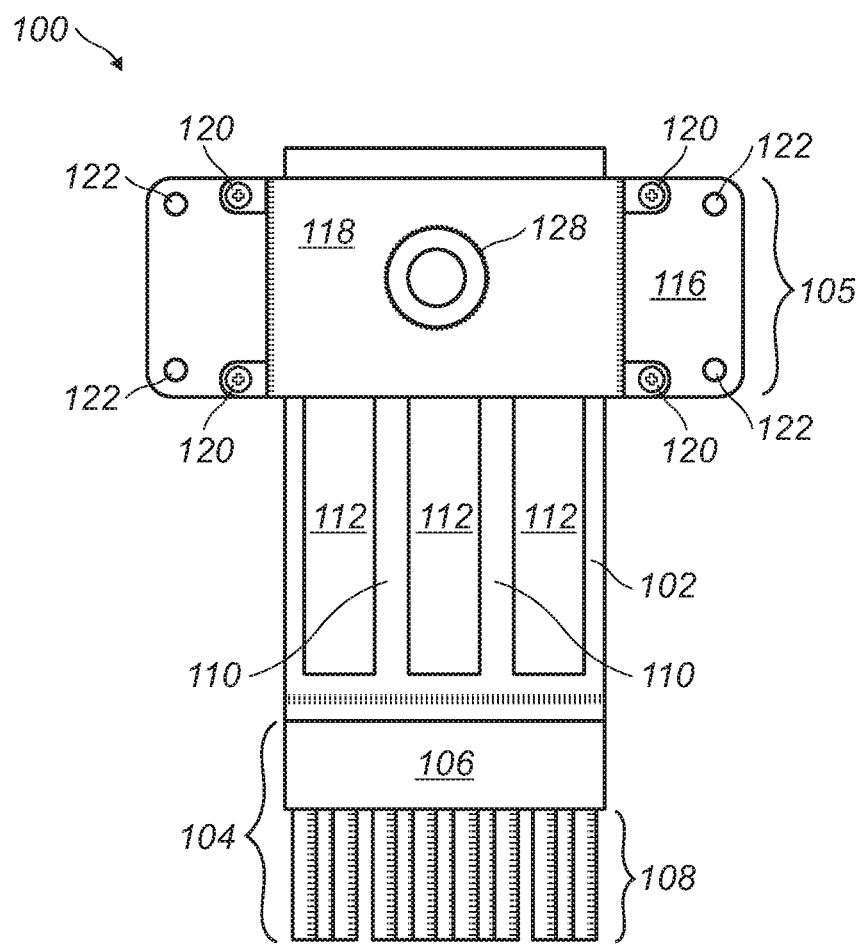
FIG. 6 is a front plan view of an alternative embodiment of the present invention.
Figure 7:
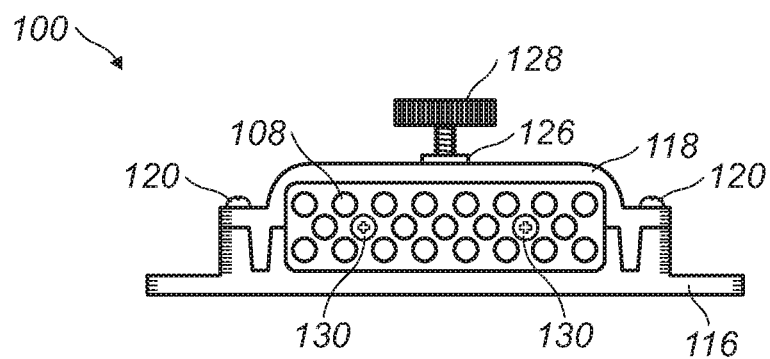
FIG. 7 is a bottom plan view of the embodiment shown in FIG. 6.
Figure 8:
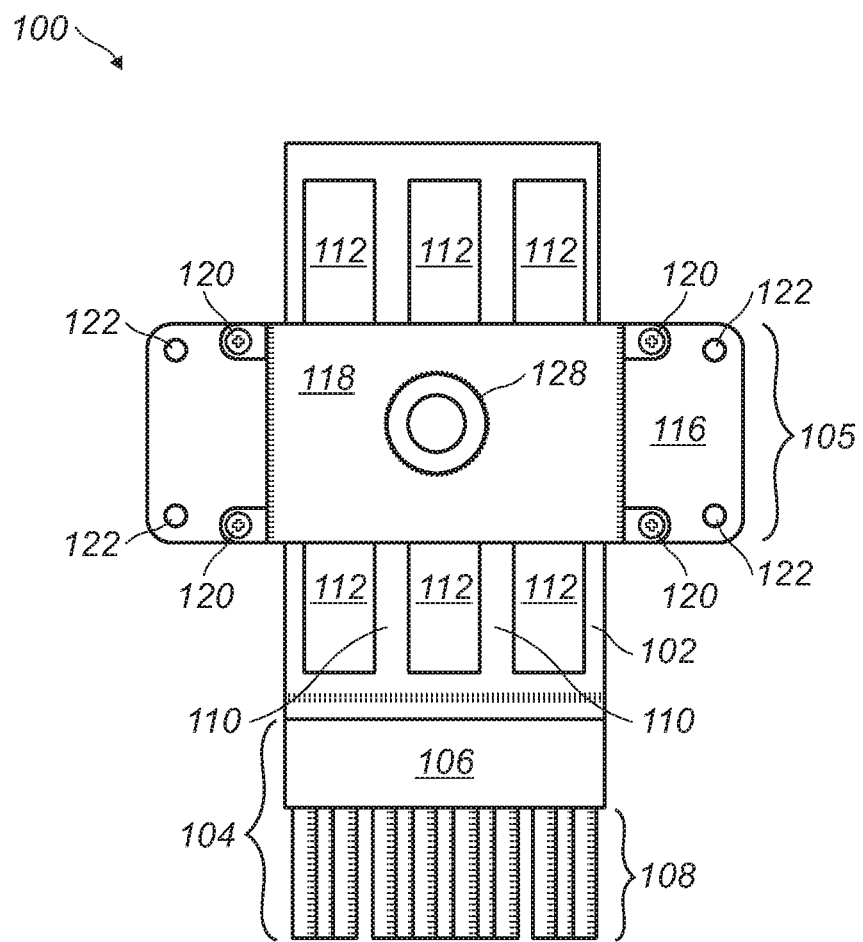
FIG. 8 is an alternative front plan view of the embodiment shown in FIG. 6.

FIGS. 6, 7 and 8 illustrate an alternative embodiment of the present invention. This embodiment may be characterized in part by a sweeping device 100 made up of a sweep 102, a bristle attachment 104, and a sweep housing 105.

The bristle attachment 104 is made up of a bristle head 106 and a plurality of bristles 108. Like the embodiment discussed above and illustrated in FIGS. 1, 2, 3, 4 and 5, one or more of the sweeping device 100 attach to a surgical table. When the surgical table is moved (by rotation or translation) in the operating room, the bristles 108 of the sweeping device 100 prevent wires, cables and other impediments in the surgical environment from impeding movement of the surgical table.

The sweep 102 comprises multiple sweep convex tracks 110 and multiple sweep concave tracks 112. The interior of the sweep housing 105 comprises multiple housing convex tracks (not shown) and multiple housing concave tracks (not shown). In this embodiment, a sweep convex track 110 corresponds with a housing concave track and a sweep concave track 112 corresponds with a housing convex track (collectively "Track Alignment"). This Track Alignment leads to efficient, linear movement of the sweep 102 within the sweep housing 105.

The sweep housing 105 consists of an inside bracket 116 and an outside bracket 118. The inside bracket 116 and an outside bracket 118 are secured to one another by one or more housing screws 120. Part of the sweep 102 is surrounded by the sweep housing 105.

The inside bracket 116 and the outside bracket 118 further comprise one or more pilot openings 122. Although not illustrated herein, each of the pilot openings 122 is capable of receiving mounting screws or other means for mounting the inside bracket to the surgical table or other mounting interface such as a mounting plate.

In addition to the means for mounting described above (e.g., mounting plate), or in alternative to, the sweeping device 100 may be attached to a surgical table by way of an adhesive strip 124 (not shown in FIGS. 6-8).

FIG. 7 illustrates the sweep housing 105 comprising a thumbscrew standoff 126, which protrudes outwardly from the sweep housing 105. A thumbscrew 128 is threadedly-connected to thumbscrew standoff 126. The thumbscrew 128 is tightened to fix the sweep 102 within the sweep housing 105. The thumbscrew 128 is loosened to allow the sweep 102 to move with respect to the sweep housing 105.

FIG. 7 also illustrates multiple bristle attachment screws 130, which connect the bristle attachment 104 to the sweep 102.

FIG. 7 also illustrates two tenons (not numbered) existing on opposite sides of the outside bracket 118. The two tenons extend into corresponding mortises (not numbered) existing on opposite sides of the inside bracket 116. The arrangement of the tenons and mortises increases the stability and securement of the inside bracket 116 and the outside bracket 118 to one another.

FIG. 8 illustrates the embodiment from FIG. 6 with the sweep 102 is secured at a different position within the sweep housing 105.

Figure 9A:
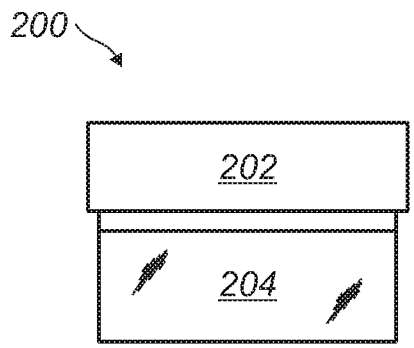
FIG. 9A is a front plan view of an alternative embodiment of the bristle attachment of FIG. 6.
Figure 9B:
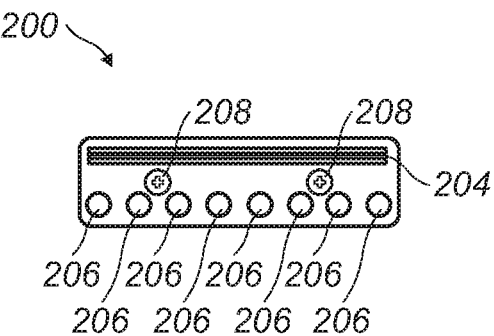
FIG. 9B is a bottom plan view of the bristle attachment of FIG. 9A.

FIGS. 9A and 9B illustrate an alternative embodiment of the bristle attachment of FIG. 6. Rather than an arrangement of twenty-one relatively uniform, rubber bristles as illustrated in FIG. 6, the bristle attachment 200 of FIGS. 9A and 9B consists of a bristle head 202, along with a rubber blade 204 and a row of bristles 206 attached to the bristle head 202. Multiple bristle attachment screws 208 connect the bristle attachment 200 to the sweep 102.

Figure 10A:
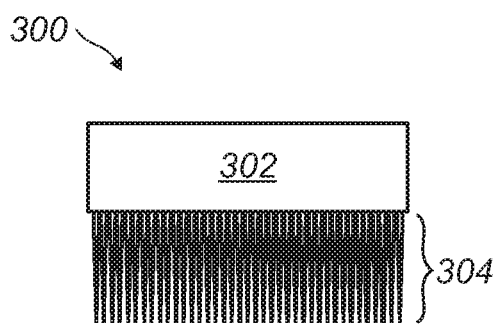
FIG. 10A is a front plan view of an alternative embodiment of the bristle attachment of FIG. 6.
Figure 10B:
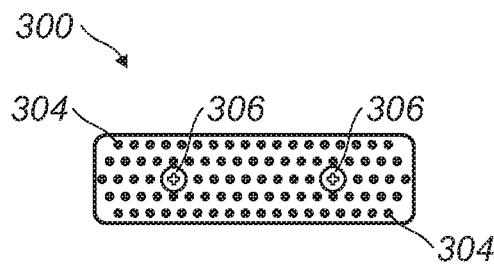
FIG. 10B is a bottom plan view of the bristle attachment of FIG. 10A.

FIGS. 10A and 10B illustrate an alternative embodiment of the bristle attachment of FIG. 6. Rather than an arrangement of twenty-one relatively uniform, rubber bristles as illustrated in FIG. 6, the bristle attachment 300 of FIGS. 10A and 10B consists of a bristle head 302, along with a plurality of thin, relatively stiff bristles 304 attached to the bristle head 302. Multiple bristle attachment screws 306 connect the bristle attachment 300 to the sweep 102.

Figure 11A:
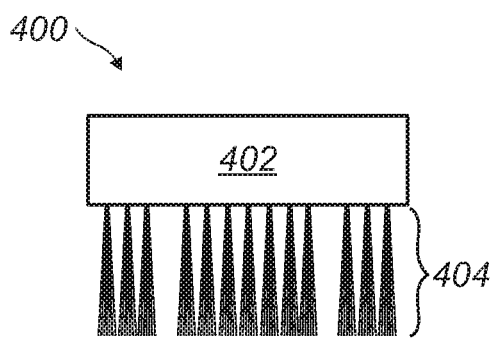
FIG. 11A is a front plan view of an alternative embodiment of the bristle attachment of FIG. 6.
Figure 11B:
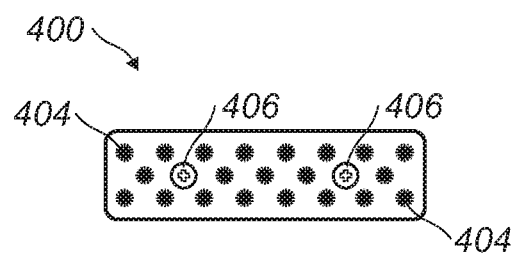
FIG. 11B is a bottom plan view of the bristle attachment of FIG. 11A.

FIGS. 11A and 11B illustrate an alternative embodiment of the bristle attachment of FIG. 6. Rather than an arrangement of twenty-one relatively uniform, rubber bristles as illustrated in FIG. 6, the bristle attachment 400 of FIGS. 11A and 11B consists of a bristle head 402, along with a plurality of boars-hair bristles 404 attached to the bristle head 402. Multiple bristle attachment screws 406 connect the bristle attachment 400 to the sweep 102. Alternatively, the type of bristles 404 used in this embodiment could be rearranged by turning the bristles upside down. This alternative embodiment would result in the thinner section of bristles adjacent to the floor and the thicker section of bristles being attached to the bristle head. It is envisioned that the thin section of bristles could provide more flexibility with changes to the floor, thresholds, etc. but the thicker section would allow for pushing strength when thicker, heavier cords are encountered by the device.

The present invention is described above in terms of preferred illustrative embodiments. Those skilled in the art will recognize that alternative constructions of such an apparatus, system, and method can be used in carrying out the present invention. Other aspects, features, and advantages of the present invention may be obtained from a study of this disclosure and the drawings, along with the appended claims.

As discussed above, the bristles described herein are illustrative and not intended to be limiting. For instance, an alternative embodiment of the present invention may include bristles in a variety and combination of quantities, characteristic shapes, dimensions, stiffness, arrangements, sizes, bristle types, etc. The different objects described herein as bristles may be characterized as bristle objects (e.g., rubber blade, rubber bristles, thin stiff bristles, boars hair bristles).

Similarly, the sweep element may be configured in a variety of physical dimensions (e.g., 2.5 inches by 0.5 inches by 6.0 inches); materials, movement with respect to housing (e.g., rectilinear). For instance, in a broad sense, the sweep may be simply considered a prism or a cylinder that when coupled with one or more of the other elements described herein satisfies the problems described in the Description of the Prior Art by removing impediments from caster wheels, surgical tables or other pieces of equipment.

Additionally, the sweep and sweep head of the embodiments discussed above were characterized as having tracks for sliding the sweep/sweep head with respect to the sweep housing. Other embodiments, may not possess tracks or might possess other means for assisting with the movement of the sweep with respect to the sweep housing.

Similarly, the bristle attachment may be configured in a variety of physical dimensions (e.g., bristle head: 2.5 inches by 0.5 inches by 0.5 inches), materials, securement with respect to sweep (e.g., bristle attachment screws, snapping mechanism, friction).

Similarly, the sweep housing may be configured in a variety of physical dimensions (e.g., 1.75 inches tall and otherwise slightly larger than the sweep in order to surround the sweep), shape, closed, open, movement with respect to the sweep; locking mechanism (e.g., thumbscrew); hardware (mounting and housing screws). For instance, in a broad sense, the sweep housing may be an object that surrounds at least part of the sweep—it might not even circumscribe the entire sweep, although it is envisioned that it will in many embodiments. When coupled with attaching means the sweep housing will attach to the surgical table or other equipment in order to operate the device.

Similarly, adhesive strip(s), mounting plate(s) and other features intended to assist with mounting the device to a surgical table or other piece of equipment may be implemented in the forms described above. Alternatively, these features could be replaced or redesigned to achieve the same result (e.g., Velcro® rather than adhesive). In some alternative embodiments, an adhesive strip may adhere directly to the sweep housing.

Other elements may be arranged or designed differently, such as the various standoffs, hardware (e.g., washers) or might not be included at all. These elements should be considered illustrative rather than limiting.

Unless otherwise indicated, all numbers expressing quantities of ingredients, properties such as molecular weight, reaction conditions, and so forth used in the present specification and associated claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques.

Finally, all articles, books, information, journals, magazines, materials, newsletters, newspapers, online materials, patent applications, patent publications, periodicals, publications, texts, and treatises, and/or any other type of publication, cited in this application are herein incorporated by reference in their entirety as if each individual reference was specifically and individually set forth herein. It should be understood that incorporated information is as much a part of the application as filed as if the information was repeated in the application, and should be treated as part of the text of the application as filed.

I claim:

1. An obstacle clearing device comprising:
   a sweep with at least one bristle object protruding from the sweep;
   a sweep housing attached to and surrounding at least part of the sweep;
   the sweep housing having at least one housing concave track and at least one housing convex track slidably fitted with the sweep; and
   the at least one bristle object comprising a bristle head and one or more bristles extending from the bristle head.

2. The obstacle clearing device of claim 1 wherein the at least one bristle object protrudes from a bristle attachment removably attached to the sweep.

3. The obstacle clearing device of claim 1 wherein the sweep comprises at least one sweep track and at least one sweep track is slidably fitted with the sweep housing.

4. The obstacle clearing device of claim 1 wherein the sweep is a rectangular prism further comprising at least one sweep concave track slidably fitted with the sweep housing and at least one sweep convex track slidably fitted with the sweep housing.

5. The obstacle clearing device of claim 1 wherein the sweep housing is secured to the sweep.

6. The obstacle clearing device of claim 1 wherein:
   the sweep further comprises at least one sweep concave track and at least one sweep convex track;
   the at least one sweep concave track is slidably fitted with the housing convex track; and
   the at least one sweep convex track is slidably fitted with the housing concave track.

7. The obstacle clearing device of claim 1 wherein the sweep housing comprises a first bracket and a second bracket.

8. The obstacle clearing device of claim 1 wherein the sweep housing is connected to a mounting bracket.

9. The obstacle clearing device of claim 1 wherein an adhesive strip is attached to at least part of the sweep housing.

10. The obstacle clearing device of claim 1 further comprising a locking mechanism connected to the sweep housing that secures the sweep with respect to the sweep housing.

11. The obstacle clearing device of claim 1 wherein the locking mechanism is a thumbscrew.

12. An obstacle clearing device comprising:
    a sweep;
    the sweep comprising a bristle attachment and a track body;
    the bristle attachment and the track body connected by one or more bristle attachment screws;
    the bristle attachment comprising a bristle head and a plurality of bristles extending from the bristle attachment;
    the track body comprising at least two sides, the at least two sides each comprising at least one sweep concave track and at least one sweep convex track;
    a sweep housing
    the sweep housing comprising an inside bracket and an outside bracket;
    the inside bracket and the outside bracket connected by one or more housing screws;
    the inside bracket comprising one or more pilot openings;
    the sweep housing comprising at least one interior facing housing convex track and at least one interior facing housing concave track;
    the sweep slidably connected to the interior of the sweep housing; and the sweep housing further comprising a thumbscrew standoff protruding outwardly and a thumbscrew threadedly-connected to thumbscrew standoff.

13. An obstacle clearing device comprising:
a sweep with at least one bristle object protruding from the sweep;
a sweep housing secured and slidably attached to the sweep, the sweep housing surrounding at least part of the sweep;
the sweep having a first end and a second end; and
the sweep housing is slidably fitted with the sweep between the first end and the second end.

14. The obstacle clearing device of claim 13 wherein the at least one bristle object protrudes from a bristle attachment removably attached to the sweep.

15. The obstacle clearing device of claim 13 wherein the sweep comprises at least one sweep concave track slidably fitted with the sweep housing and at least one sweep convex track slidably fitted with the sweep housing.

16. The obstacle clearing device of claim 13 wherein the sweep housing comprises at least one housing concave track and at least one housing convex track slidably fitted with the sweep.

17. The obstacle clearing device of claim 16 wherein:
the sweep further comprises at least one sweep concave track and at least one sweep convex track;
the at least one sweep concave track is slidably fitted with the housing convex track; and
the at least one sweep convex track is slidably fitted with the housing concave track.

18. The obstacle clearing device of claim 13 further comprising a locking mechanism connected to the sweep housing that secures the sweep with respect to the sweep housing.

19. The obstacle clearing device of claim 18 wherein the locking mechanism is a thumbscrew.

20. An obstacle clearing device comprising:
a sweep;
at least one bristle object attached to the sweep;
the bristle object having a bristle head and one or more bristles extending from the bristle head;
a non-rotational sweep housing attached to and surrounding at least part of the sweep;
the sweep having a first end and a second end; and
the sweep housing is slidably fitted with the sweep between the first end and the second end.

21. The obstacle clearing device of claim 20 wherein the at least one bristle object is removably attached to the sweep.

22. The obstacle clearing device of claim 20 wherein the sweep comprises at least one sweep track and at least one sweep track is slidably fitted with the sweep housing.

23. The obstacle clearing device of claim 20 wherein the sweep is a rectangular prism further comprising at least one sweep concave track slidably fitted with the sweep housing and at least one sweep convex track slidably fitted with the sweep housing.

24. The obstacle clearing device of claim 20 wherein the sweep housing comprises at least one housing concave track and at least one housing convex track slidably fitted with the sweep.

25. The obstacle clearing device of claim 24 wherein:
the sweep further comprises at least one sweep concave track and at least one sweep convex track;
the at least one sweep concave track is slidably fitted with the housing convex track; and
the at least one sweep convex track is slidably fitted with the housing concave track.

26. The obstacle clearing device of claim 20 wherein the sweep housing comprises a first bracket and a second bracket.

27. The obstacle clearing device of claim 20 wherein the sweep housing is connected to a mounting bracket.

28. The obstacle clearing device of claim 20 wherein an adhesive strip is attached to at least part of the sweep housing.

29. The obstacle clearing device of claim 20 further comprising a locking mechanism connected to the sweep housing that secures the sweep with respect to the sweep housing.

30. The obstacle clearing device of claim 29 wherein the locking mechanism is a thumbscrew.

* * * * *